United States Patent
Hidaka et al.

(10) Patent No.: US 11,866,034 B2
(45) Date of Patent: Jan. 9, 2024

(54) PARKING ASSIST SYSTEM

(71) Applicant: DENSO CORPORATION, Kariya (JP)

(72) Inventors: Takamasa Hidaka, Kariya (JP); Koudai Yamaura, Kariya (JP)

(73) Assignee: DENSO CORPORATION, Kariya (JP)

( * ) Notice: Subject to any disclaimer, the term of this patent is extended or adjusted under 35 U.S.C. 154(b) by 175 days.

(21) Appl. No.: 17/587,544

(22) Filed: Jan. 28, 2022

(65) Prior Publication Data
US 2022/0144251 A1 May 12, 2022

Related U.S. Application Data

(63) Continuation of application No. PCT/JP2020/028874, filed on Jul. 28, 2020.

(30) Foreign Application Priority Data

Aug. 1, 2019 (JP) ................. 2019-142120

(51) Int. Cl.
*B60W 30/06* (2006.01)
*G01C 21/34* (2006.01)
*G01C 21/36* (2006.01)

(52) U.S. Cl.
CPC ......... *B60W 30/06* (2013.01); *G01C 21/3469* (2013.01); *G01C 21/3685* (2013.01)

(58) Field of Classification Search
CPC .............. B60W 30/06; G01C 21/3469; G01C 21/3685; G08G 1/14; G08G 1/096708; G08G 1/0969; G08G 1/148
See application file for complete search history.

(56) References Cited

U.S. PATENT DOCUMENTS

| 10,875,576 B2 * | 12/2020 | Derendarz | B60W 30/06 |
| 10,981,599 B2 * | 4/2021 | Hattori | B60W 50/14 |
| 11,703,877 B2 * | 7/2023 | Yoon | B60R 25/23 |
| | | | 701/23 |
| 2017/0308095 A1 * | 10/2017 | Irion | G05D 1/0282 |

(Continued)

FOREIGN PATENT DOCUMENTS

| CN | 103810898 A | 5/2014 |
| CN | 107207005 A | 9/2017 |

(Continued)

*Primary Examiner* — Mohamed Barakat
(74) *Attorney, Agent, or Firm* — Harness, Dickey & Pierce, P.L.C.

(57) ABSTRACT

A parking assist system includes an automated driving vehicle and a management device configured to transmit, to the automated driving vehicle, a guide path to a parking position and a parking start instruction. The automated driving vehicle includes an information transmission unit that transmits, to the management device, travelable information in response to receiving predetermined data from the management device. The management device includes a data transmission unit that transmits the predetermined data and a driving setting unit that determines, based on the travelable information transmitted from the at least one automated driving vehicle, whether parking of the automated driving vehicle is possible and instruct the automated driving vehicle to start parking in response to determining that parking of the automated driving vehicle is possible.

18 Claims, 8 Drawing Sheets

(56) References Cited

U.S. PATENT DOCUMENTS

| | | | |
|---|---|---|---|
| 2018/0012156 A1 | 1/2018 | Voelz et al. | |
| 2020/0050212 A1* | 2/2020 | Mimura | B60W 30/0956 |
| 2020/0150657 A1* | 5/2020 | Yoo | B60R 25/209 |
| 2020/0290601 A1* | 9/2020 | Yamanaka | B60W 10/20 |

FOREIGN PATENT DOCUMENTS

| | | |
|---|---|---|
| JP | 2011054116 A | 3/2011 |
| JP | 2011218863 A | 11/2011 |

\* cited by examiner

FIG. 6

| | | |
|---|---|---|
| TRAVELABLE DISTANCE LEVEL | 0 | PARKING NOT POSSIBLE |
| | 1 | "NEAR" OR "FAR" AREA |
| | 2 | ANOTHER AREA |
| | EV | EV CHARGING AREA |
| FAILURE INFORMATION | EXISTENCE | PARKING NOT POSSIBLE |
| | NONEXISTENCE | SET ACCORDING TO LEVEL |

PARKING ASSIST SYSTEM

CROSS REFERENCE TO RELATED APPLICATIONS

This application is a continuation application of International Patent Application No. PCT/JP2020/028874 filed on Jul. 28, 2020, which designated the U.S. and claims the benefit of priority from Japanese Patent Application No. 2019-142120 filed on Aug. 1, 2019. The entire disclosure of all of the above application is incorporated herein by reference.

TECHNICAL FIELD

The present disclosure relates to a parking assist system configured to assist parking of a vehicle.

BACKGROUND ART

There has been known a parking assist system that is configured to guide, when an instruction is transmitted from a management device installed in a parking lot to an automated driving vehicle, an automated driving vehicle from a riding/getting-off area where a vehicle user rides on and gets off the vehicle to a parking area where the vehicle can be parked.

SUMMARY

One aspect of the present disclosure is a parking assist system configured to assist parking of vehicles. The system includes: at least one automated driving vehicle configured to perform automated driving, in a parking lot, from a getting-off area to a parking position; and a management device configured to transmit, to the automated driving vehicle, a guide path to the parking position and a parking start instruction. The at least one automated driving vehicle includes an information transmission unit that is configured to transmit, to the management device, travelable information relating to travelling of the at least one automated driving vehicle in response to receiving predetermined data from the management device. The management device includes: a data transmission unit configured to transmit the predetermined data to the at least one automated driving vehicle; and a driving setting unit configured to: determine, based on the travelable information transmitted from the at least one automated driving vehicle, whether parking of the at least one automated driving vehicle is possible; and instruct the at least one automated driving vehicle to start parking in response to determining that parking of the at least one automated driving vehicle is possible.

BRIEF DESCRIPTION OF DRAWINGS

The above and other objects, features and advantages of the present disclosure will become more apparent from the following detailed description made with reference to the accompanying drawings.

FIG. 6 represents an example of travelable information.

DESCRIPTION OF EMBODIMENTS

Figure 1:
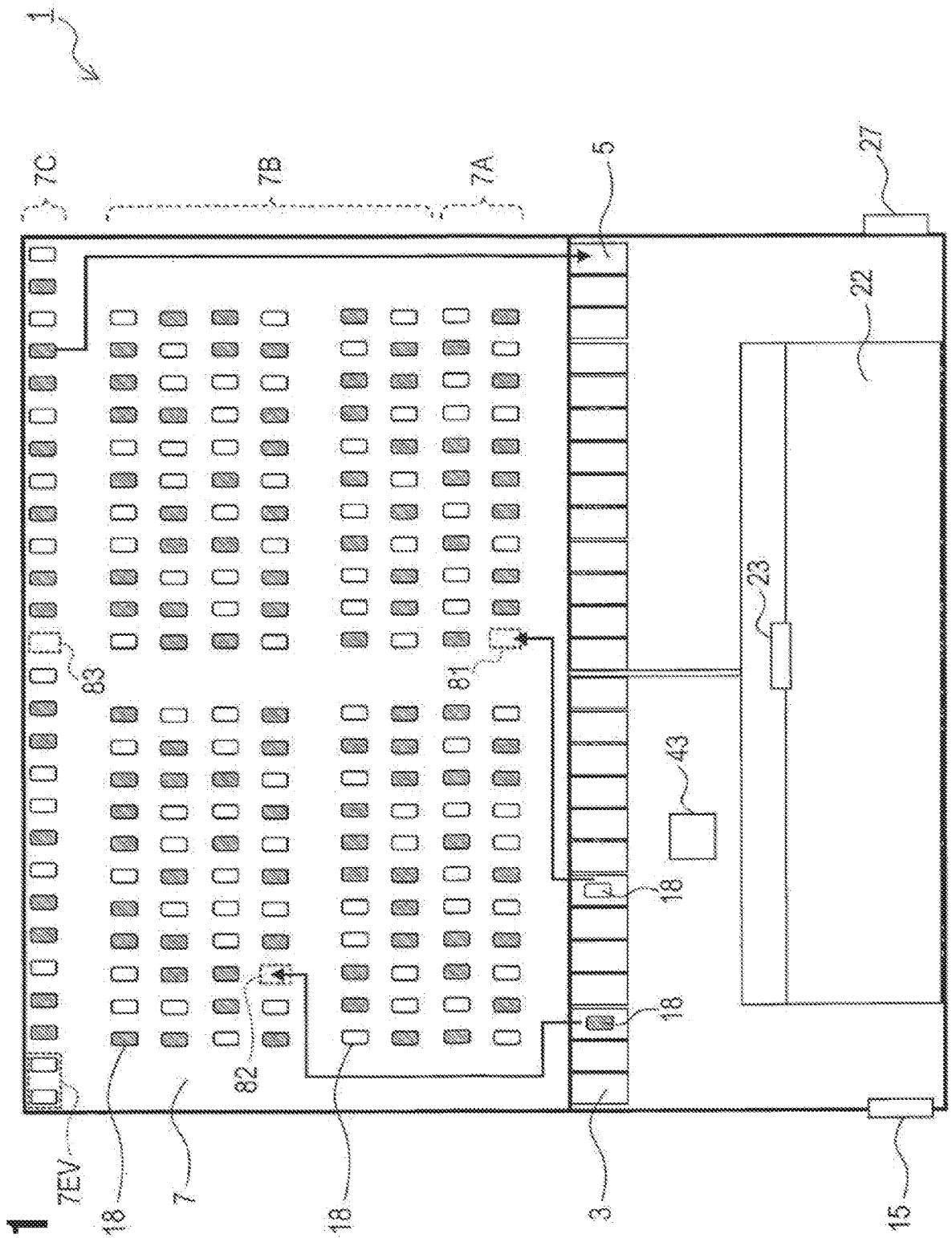
FIG. 1 is a schematic plan view showing a whole of a parking assist system.

To begin with, a relevant technology will be described only for understanding the following embodiments.

As a result of detailed study made by the inventors of the present disclosure, a problem has been found in a conventional parking assist system that if the distance from the riding/getting-off area to the parking area is long, an insufficient remaining fuel amount or battery capacity or a vehicle failure causes an automated driving vehicle to stall in the parking lot.

An aspect of this disclosure is to provide a parking assist system that is configured to assist parking of an automated driving vehicle without occurrence of stalling of the automated driving vehicle in a parking lot.

As described above, according to the one aspect of the present disclosure, a parking assist system is configured to assist parking of vehicles. The system includes: at least one automated driving vehicle configured to perform automated driving, in a parking lot, from a getting-off area to a parking position; and a management device configured to transmit, to the automated driving vehicle, a guide path to the parking position and a parking start instruction. The at least one automated driving vehicle includes an information transmission unit that is configured to transmit, to the management device, travelable information relating to travelling of the at least one automated driving vehicle in response to receiving predetermined data from the management device. The management device includes: a data transmission unit configured to transmit the predetermined data to the at least one automated driving vehicle; and a driving setting unit configured to: determine, based on the travelable information transmitted from the at least one automated driving vehicle, whether parking of the at least one automated driving vehicle is possible; and instruct the at least one automated driving vehicle to start parking in response to determining that parking of the at least one automated driving vehicle is possible.

According to another aspect of the present disclosure, a parking assist system is configured to assist parking of an automated driving vehicle that is configured to perform automated driving, in a parking lot, from a getting-off area to a parking position. The parking assist system includes: a management device configured to transmit, to the automated driving vehicle, a guide path to the parking position and a parking start instruction. The management device includes: a driving setting unit configured to receive travelable information transmitted from the automated driving vehicle, the travelable information being information relating to traveling of the automated driving vehicle; and a data transmission unit configured to transmit predetermined data to the automated driving vehicle in response to receiving a parking request for parking of the automated driving vehicle to the parking position from a terminal device that is configured to communicate with the management device. The driving setting unit is configured to, prior to receiving the parking request from the terminal device: receive the travelable information from the automated driving vehicle; and determine whether parking of the automated driving vehicle is possible based on the received travelable information.

According to yet another aspect of the present disclosure, a parking assist system is configured to assist parking of vehicles. The system includes: at least one automated driving vehicle configured to perform automated driving, in a parking lot, from a getting-off area to a parking position; and a management device configured to transmit, to the automated driving vehicle, a guide path to the parking position and a parking start instruction. The at least one automated driving vehicle includes an information transmission unit that is configured to transmit, to the management device, travelable information relating to travelling of the at least one automated driving vehicle in response to receiving predetermined data from the management device. The management device includes at least one processor configured to: transmit the predetermined data to the at least one automated driving vehicle; determine, based on the travelable information transmitted from the at least one automated driving vehicle, whether parking of the at least one automated driving vehicle is possible; and instruct the at least one automated driving vehicle to start parking in response to determining that parking of the at least one automated driving vehicle is possible.

According to the parking assist systems as described above, feasibility of parking by an automated driving vehicle is determined based on travelable information. Therefore, when the automated driving vehicle is feared to run out of fuel or remaining battery power (hereinafter also referred to as "running out of battery capacity"), parking of the automated driving vehicle can be determined not to be possible and therefore the parking request is refused. This makes it possible to prevent an occurrence of stalling of the automated driving vehicle in the parking lot.

In the following, embodiments of this disclosure will be described with reference to drawings.

1. Embodiment 1-1. Configuration of Parking Assist System

The configuration of a parking assist system 1 will be described based on FIG. 1 to FIG. 3. As shown in FIG. 1, the parking assist system 1 includes an incoming vehicle room 3 provided in a getting-off area where users get out of their vehicles, an outgoing vehicle room 5 provided in a riding area where users ride on their vehicles, and a parking lot 7. In the following, the area including the incoming vehicle room 3, the outgoing vehicle room 5, and the parking lot 7 may also be referred to as the "parking facility."

The incoming vehicle room 3 and the outgoing vehicle room 5 each include plural divisions. The incoming vehicle room 3 is connected to the outside of the parking assist system 1 via an entrance 15. An automated driving vehicle 18 can enter the incoming vehicle room 3 from outside through the entrance 15. The automated driving vehicle 18 is provided with an automated valet parking function.

The automated driving vehicle 18 is required to be capable of performing the automated valet parking function and need not have a function for automated driving outside the parking facility. The automated valet parking function includes a function for automated driving from the incoming vehicle room 3 to a parking position in the parking lot 7 and parking there and a function for automated driving from a parking position in the parking lot 7 to the outgoing vehicle room 5.

The automated valet parking function particularly includes a function for repeatedly acquiring position information on the automated driving vehicle 18 and transmitting the information to a management device 39 and a function for receiving guide path information from the management device 39 and controlling the automated driving vehicle 18 to travel along the guide path. The position information on the automated driving vehicle 18 represents an estimated current position of the automated driving vehicle 18 and includes, for example, coordinate values in the area of the parking facility.

The incoming vehicle room 3 and the outgoing vehicle room 5 are adjacent to an entrance 23 of facilities 22 including stores. Occupants of the automated driving vehicle 18 having entered the incoming vehicle room 3 can get out of the automated driving vehicle 18 and walk to the entrance 23.

The outgoing vehicle room 5 is connected to the outside of the parking assist system 1 via an exit 27. The automated driving vehicle 18 can proceed from the outgoing vehicle room 5 to the outside of the parking assist system 1 through the exit 27. The outgoing vehicle room 5 is adjacent to the entrance 23. People to be vehicle occupants can walk from the entrance 23 to the outgoing vehicle room 5.

The parking lot 7 allows parking of plural automated driving vehicles 18. The parking lot 7 includes plural parking areas. The plural parking areas include plural divisions. In the following, the direction in which plural divisions are arranged in the incoming vehicle room 3 and the outgoing vehicle room 5 will be referred to as the "row direction."

The two rows of divisions arranged along the row direction to be nearest to the incoming vehicle room 3 and the outgoing vehicle room 5 will be referred to as a "near area 7A." Also, the row of divisions arranged along the row direction to be farthest from the incoming vehicle room 3 and the outgoing vehicle room 5 will be referred to as a "far area 7C." In the parking lot 7, the area between the near area 7A and the far area 7C will be referred to as an "intermediate area 7B."

The far area 7C includes a charging area 7EV, a division installed with equipment for charging electric vehicles.

The parking lot 7 may be multi-storied. In cases where the parking lot 7 is multi-storied, the two rows of divisions nearest to the incoming vehicle room 3 and the outgoing vehicle room 5 make up the near area 7A. The row of divisions farthest from the incoming vehicle room 3 and the outgoing vehicle room 5 make up the far area 7C. The remaining divisions in other than the near area 7A and the far area 7C in the parking lot 7 make up the intermediate area 7B. The nearest two rows of divisions refer to the two rows of divisions that can be reached by vehicles by traveling a shortest distance, or, in other words, through a shortest guide path. The farthest row of divisions refer to the row of divisions requiring vehicles to travel a longest distance, or, in other words, through a longest guide path to reach there.

Each division provided in the incoming vehicle room 3, outgoing vehicle room 5, and parking lot 7 is an area where one automated driving vehicle 18 can be parked. Each automated driving vehicle 18 can travel from the incoming vehicle room 3 to the parking lot 7 and from the parking lot 7 to the outgoing vehicle room 5.

Figure 2:
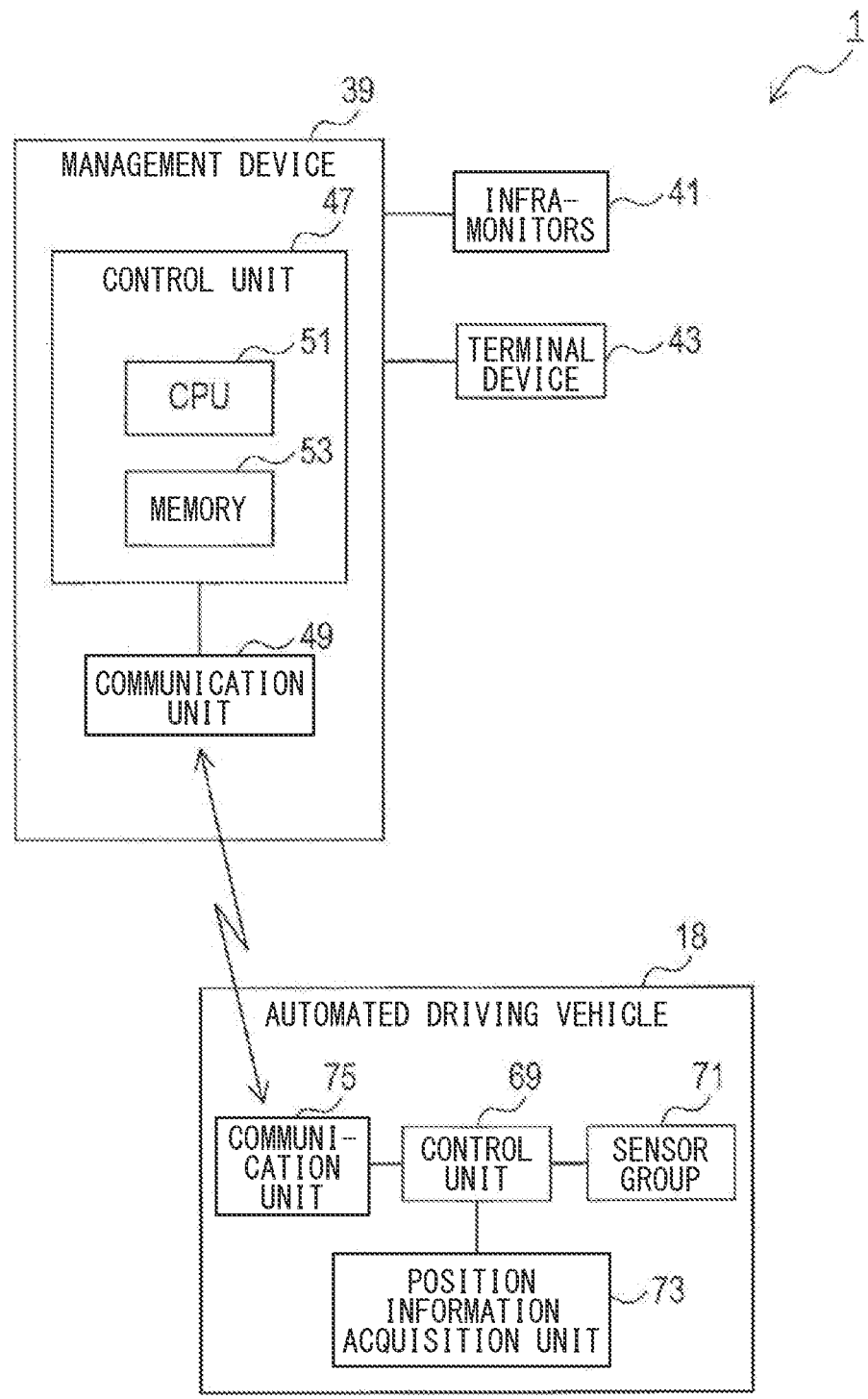
FIG. 2 is a block diagram showing a configuration of the parking assist system.

As shown in FIG. 2, the parking assist system 1 includes the management device 39, infra-monitors 41, and a terminal device 43.

The management device 39 includes a control unit 47 and a communication unit 49. The control unit 47 includes a microprocessor provided with a CPU 51 and a semiconductor memory, for example, a RAM or a ROM, (hereinafter referred to as a "memory 53").

The functions of the control unit 47 are realized by having programs stored in a non-transitory substantial recording medium executed by the CPU 51. In the present example, the memory 53 is the non-transitory substantial recording medium holding programs. When the programs are executed, the methods corresponding to the programs are executed. The control unit 47 may be provided with one or more microprocessors.

Figure 3:
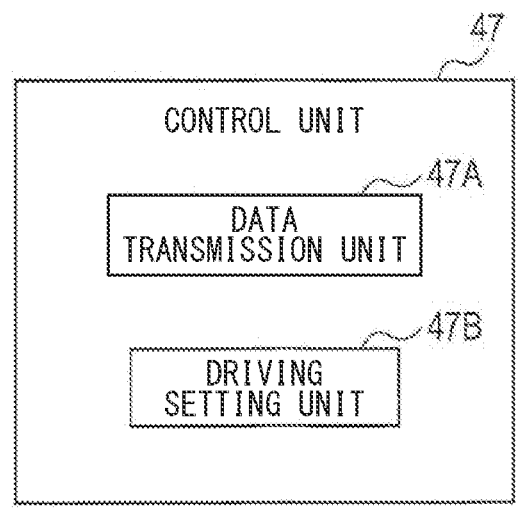
FIG. 3 is a block diagram showing a configuration of a control unit of a management device.

The control unit 47 is configured to transmit information on a guide path leading to a parking position and a parking start instruction to the automated driving vehicle 18 and includes, for example, as shown in FIG. 3, a data transmission unit 47A and a driving setting unit 47B. The operations of the units 47A and 47B included in the control unit 47 will be described later.

The memory 53 stores map information on the parking facility. The map information includes information representing the states of divisions of the parking lot 7. The divisions are each either in an unoccupied state (hereinafter referred to as "vacant" or in a state occupied by an automated driving vehicle 18 (hereinafter referred to as "occupied"). In the example shown in FIG. 1, divisions 81, 82, and 83 are vacant with the other divisions occupied. The division 81 is in the near area 7A, the division 82 in the intermediate area 7B, and the division 83 in the far area 7C. The communication unit 49 can communicate with the automated driving vehicle 18. The memory 53 stores setting information on the near area 7A, intermediate area 7B, and far area 7C of the parking lot 7.

The infra-monitors 41 include devices for acquiring information representing internal conditions of the parking assist system 1 (hereinafter referred to as "parking lot interior information") and supplying the acquired parking lot interior information to the management device 39. The infra-monitors 41 include cameras and Lidars for taking images of the interior of the parking assist system 1.

The parking lot interior information includes, for example, information indicating where obstacles are located, information representing states of the divisions of the parking lot 7, and information on positions of automated driving vehicles 18 in the parking assist system 1.

The terminal device 43 is, as shown in FIG. 1, installed near the incoming vehicle room 3. The terminal device 43 accepts input operations by vehicle occupants. The terminal device 43 outputs signals corresponding to input operations performed to the management device 39.

The terminal device 43, for example, outputs, according to an input operation performed, a parking request signal. A parking request signal is a signal to request driving an automated driving vehicle 18 in the incoming vehicle room 3 to the parking lot 7 and parking the vehicle there. The terminal device 43, when outputting a signal corresponding to an input operation performed to the management device 39, outputs identification information on the automated driving vehicle 18.

The terminal device 43, for example, outputs, according to an input operation performed, a leaving request signal. The leaving request signal is a signal to request driving an automated driving vehicle 18 parked in the parking lot 7 to the outgoing vehicle room 5. Also, the terminal device 43 outputs, according to an input operation performed, identification information on the automated driving vehicle 18. The identification information is, for example, license plate information for uniquely identifying the automated driving vehicle 18.

Figure 4:
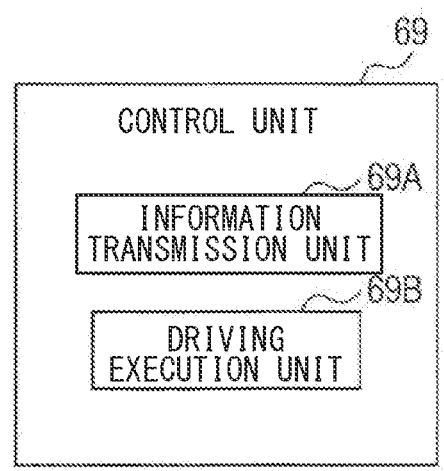
FIG. 4 is a block diagram showing a configuration of a control unit of a vehicle.

The automated driving vehicle 18 is, as described above, provided with the automated valet parking function. As shown in FIG. 2, the automated driving vehicle 18 is provided with a control unit 69, a sensor group 71, a position information acquisition unit 73, and a communication unit 75. The control unit 69 is provided, as shown in FIG. 4, with an information transmission unit 69A and a driving execution unit 69B. Operations of these units 69A and 69B included in the control unit 69 will be described later.

The control unit 69 controls each unit of the automated driving vehicle 18. Automated driving functions are realized by control performed by the control unit 69. The automated driving vehicle 18 acquires, from the management device 39, map information on the parking facility and guide path information, and, when performing automated driving, uses the parking facility map information and the guide path information.

The sensor group 71 acquires periphery information representing peripheral conditions of the automated driving vehicle 18. The periphery information represents, for example, the positions of obstacles around the automated driving vehicle 18. The sensor group 71 includes, for example, cameras and Lidars. The automated driving vehicle 18 uses the periphery information for automated driving. The sensor group 71 farther includes a sensor for detecting the amount of fuel stored in the fuel tank of the automated driving vehicle 18 as the amount of remaining fuel.

The position information acquisition unit 73 acquires position information on the automated driving vehicle 18. The position information acquisition unit 73 is, for example, a position estimation system using Lidars and maps. The automated driving vehicle 18 uses the position information on the vehicle for automated driving. The communication unit 75 can communicate with the management device 39.

1-2. Processing 1-2-1. Processing Executed by Management Device 39

Figure 5:
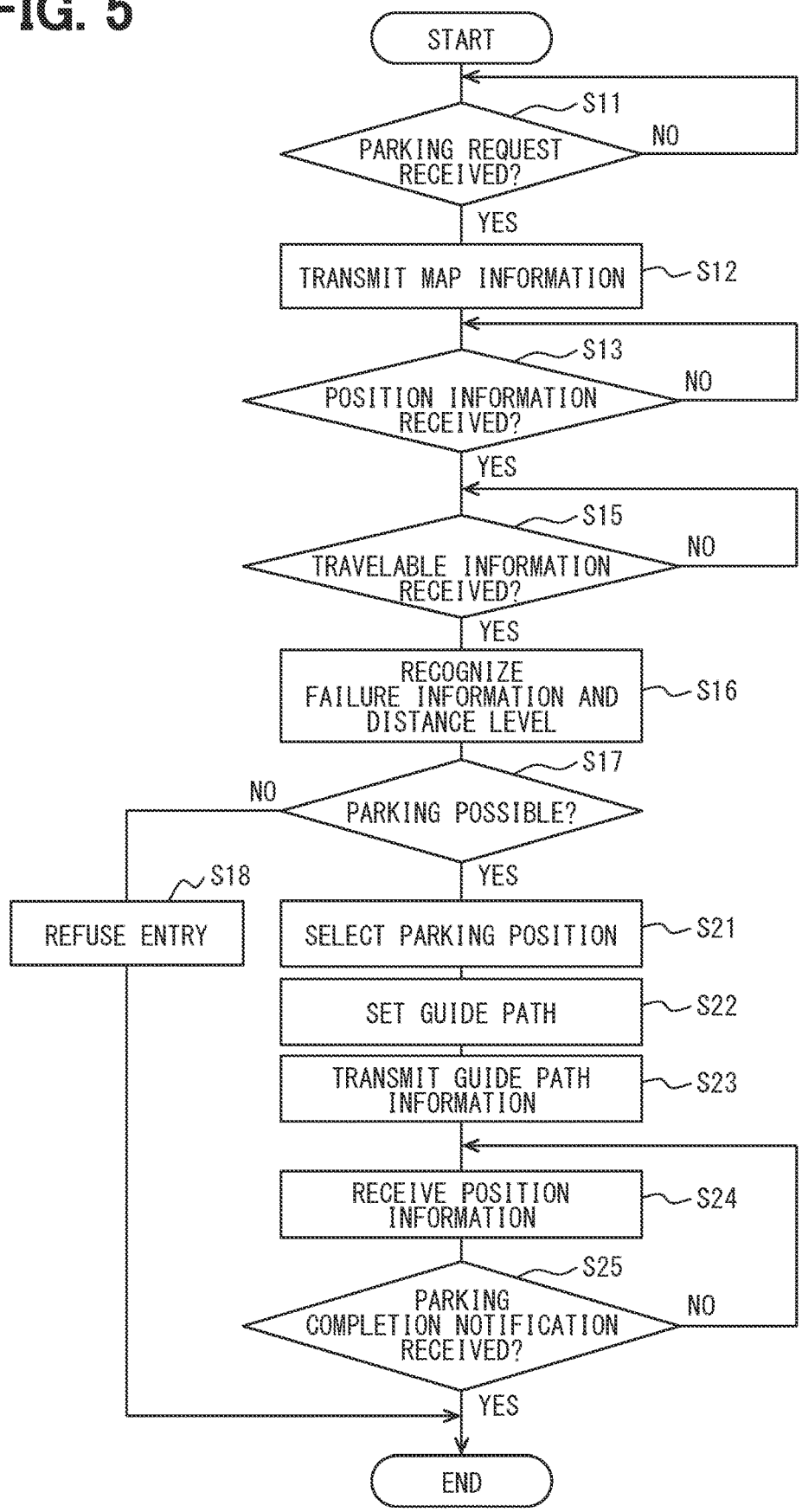
FIG. 5 is a flowchart of a parking setting process.

Parking setting processing executed by the management device 39 will be described with reference to FIG. 5. The parking setting processing is started, for example, when the management device 39 is powered on and is, subsequently, executed repeatedly.

The data transmission unit 47A of the management device 39 determines, at step (herein after referred to as "S") 11 of the parking setting processing represented in FIG. 5, whether a parking request signal has been received.

When the user inputs a parking request by operating the terminal device 43, the terminal device 43 transmits a parking request signal corresponding to the input to the management device 39. At this time, the user inputs, to the terminal device 43, vehicle identifying information, for example, license plate information, user identifying information, for example, a user ID and a password, and other required information.

When the terminal device 43 is operated, information such as vehicle information and user information is transmitted to the management device 39. After performing the operation for the parking request, the user can leave the parking facility to head for his/her destination.

Subsequently, the data transmission unit 47A of the management device 39 transmits, at S12, map information on the parking facility to the automated driving vehicle 18. That is, when the user performs an input operation through the terminal device 43 to notify of a start of parking and a parking request requesting parking of the automated driving vehicle 18 to a parking position is received from the terminal device 43, the data transmission unit 47A transmits the map information of the parking facility to the automated driving vehicle 18. The map information of the parking facility is predetermined data in this disclosure.

The automated driving vehicle 18 is, as being described later, set to respond, when the map information is received, by transmitting the position information of the vehicle and travelable information. Hence, at S13, the data transmission unit 47A of the management device 39 determines whether the position information has been received. When, at S13, the position information is determined not to be received, execution of S13 is repeated. In this way, the data transmission unit 47A acquires the position information transmitted from the automated driving vehicle 18.

When, at S13, it is determined that the position information has been received, the process proceeds to S15 where the driving setting unit 47B of the management device 39 determines whether the travelable information has been received from the automated driving vehicle 18.

The travelable information is information relating to traveling of the automated driving vehicle 18. More specifically, the travelable information represents degree of likelihood of the automated driving vehicle 18 to be unable to travel in the parking lot during parking. The travelable information includes, as information related with the travelable distance, a remaining fuel amount or a remaining battery capacity and also, as failure information of the automated driving vehicle, for example, tire pressures, warning signs, and failure codes of electronic control devices. Even though, in the present embodiment, the travelable information includes both information relating to travelable distance and information relating to vehicle failures (hereinafter referred to also as "failure information"), the travelable information may be either one of information related with travelable distance or information related with vehicle failures.

The travelable information may be information representing the remaining fuel amount. Alternatively, the travelable information may be information representing the remaining battery capacity estimated by the control unit 69. The remaining battery capacity is estimated by the control unit 69 of the automated driving vehicle 18 based on battery current, voltage and temperature. The information transmission unit 69A may transmit, as the travelable information, information representing an estimated remaining battery capacity to the management device 39. The travelable information may be information representing a travelable distance.

When, at S15, it is determined that the travelable information has not been received from the automated driving vehicle 18, the driving setting unit 47B repeats execution of S15. When, on the other hand, it is determined that the travelable information has been received from the automated driving vehicle 18, process proceeds to S16 where the driving setting unit 47B recognizes failure information and the level of travelable distance (hereinafter referred to as the "distance level"). The travelable information may be either information related with travelable distance or information related with vehicle failures.

The failure information is information determined based on the above-described information related with vehicle failures. In the present embodiment, when the information related with vehicle failures indicates that a tire pressure is lower than a predetermined threshold or that a warning has been issued on the automated driving vehicle 18, the driving setting unit 47B determines, as shown in FIG. 6, that the failure information is present. When all tire pressures are equal to or higher than the predetermined threshold with no warning issued on the automated driving vehicle 18, the driving setting unit 47B determines that no failure information is present.

The driving setting unit 47B may determine, when any warning or any failure code of any electronic control device is of a type that would hamper automated parking, that the failure information is present and, when no warning and no failure code are of a type that would hamper automated parking, that no failure information is present. For example, when a failure code is related to brakes, the failure information is determined to be present and, when the failure code is related to a meter, no failure information is determined to be present.

That is, the management device 39 may determine that the failure information exists when any warning or failure code is received or may determine that the failure information exists only when a predetermined type of warning or failure code is detected.

The distance level is information determined based on the above-described information related with the travelable distance. The distance level is divided, for example, into four—0, 1, 2, and EV as shown in FIG. 6. The driving setting unit 47B recognizes, based on the information related with the travelable distance, the distance that can be traveled by the automated driving vehicle 18 and sets, according to the distance recognized, the distance level of the automated driving vehicle 18 to 0, 1, or 2. However, if the automated driving vehicle 18 is an electric vehicle and the charging area 7EV has vacancy, the driving setting unit 47B sets the distance level of the automated driving vehicle 18 to EV.

When it is determined that the travelable distance of the automated driving vehicle 18 is shorter than a first threshold representing a very short predetermined distance, the distance level of the automated driving vehicle 18 is set to 0. When the travelable distance of the automated driving vehicle 18 is determined to be shorter than a second predetermined threshold that is equal to or longer than the first threshold and is determined to be equal to or longer than the first threshold, the distance level of the automated driving vehicle 18 is set to 1. When the travelable distance of the automated driving vehicle 18 is determined to be equal to or longer than the second threshold, the distance level of the automated driving vehicle 18 is set to 2.

Subsequently, processing advances to S17 where the driving setting unit 47B determines, based on the travelable information transmitted from the automated driving vehicle 18, whether parking of the automated driving vehicle 18 is possible. At this time, the driving setting unit 47B determines that, when there is failure information on the automated driving vehicle 18 or when the distance level of the automated driving vehicle 18 is 0, parking of the automated driving vehicle 18 is determined not to be possible. When parking of the automated driving vehicle 18 is determined not to be possible, processing advances to S18 where the driving setting unit 47B refuses entry of the automated driving vehicle 18 and ends the parking setting processing.

When parking is determined to be possible, processing advances to S21 where the driving setting unit 47B selects a parking position. The parking position is selected out of the vacant divisions of the parking lot 7. When there is only one vacant division, the driving setting unit 47B selects the vacant division as the parking position. When there are plural vacant divisions, the driving setting unit 47B selects, based on a predetermined criterion, one of the plural vacant divisions as the parking position. Specifically, the parking position is set according to the remaining fuel amount or remaining battery capacity.

As the predetermined criterion, for example, the driving setting unit 47B sets, when the remaining fuel amount or remaining battery capacity is decreased, the parking position in the near area 7A that is, among the plural parking areas in the parking lot, the parking area nearest to the riding area or getting-off area in the parking lot. This is to suppress fuel or battery consumption by setting a shortest possible distance to be traveled by the automated driving vehicle 18, or, in other words, by making the distance from the getting-off area to the parking area and the distance from the parking area to the riding area as short as possible.

Alternatively, when the remaining fuel amount or remaining battery capacity is decreased, the driving setting unit 47B sets the parking position in the far area 7C that is, among the plural parking areas in the parking lot, the parking area farthest from the riding area or getting-off area in the parking lot. This is because, considering that there are cases in which, after parking the automated driving vehicle 18 in a parking area, the automated driving vehicle 18 is required to move in order to allow moving of another vehicle, parking the automated driving vehicle 18 in the far area 7C reduces the possibility of the automated driving vehicle 18 being later required to move.

The driving setting unit 47B may determine, when the remaining fuel amount or remaining battery capacity is smaller than a first threshold, that parking of the automated driving vehicle 18 is not possible. Also, the driving setting unit 47B may determine, when the remaining fuel amount or remaining battery capacity is equal to or larger than a second threshold larger than the first threshold, that parking of the automated driving vehicle 18 is possible. Furthermore, when the remaining fuel amount or remaining battery capacity is equal to or larger than the first threshold and smaller than the second threshold, the driving setting unit 47B may determine that parking of the automated driving vehicle 18 is possible provided that a different preset condition (for example, the near area 7A has a vacant space) is met or may determine, when the different preset condition is not met, that parking of the automated driving vehicle 18 is not possible.

The driving setting unit 47B, when it determines that parking is possible, may set a parking position in the near area 7A.

In the configuration of the present embodiment, the distance level is set for each automated driving vehicle 18 to be parked, so that the parking area to be used is selected according to the distance level as shown in FIG. 6. Namely, when the distance level is 1, the parking position is set, on a priority basis, in the near area 7A or far area 7C, and, when the distance level is 2, the parking position is set, on a priority basis, in the intermediate area 7B. When both the near area 7A and the far area 7C have vacancy, either the near area 7A or the far area 7C is selected according to a predetermined priority order. When only one vacant division is available, the vacant division may be set as the parking position regardless of the distance level.

The driving setting unit 47B determines the state of each division, for example, as follows. When the automated driving vehicle 18 parks in a division, the identification information on the division and parking start information is transmitted from the automated driving vehicle 18 to the management device 39. When the automated driving vehicle 18 leaves the division where the vehicle has been parked, the identification information on the division and parking end information is transmitted from the automated driving vehicle 18 to the management device 39.

The driving setting unit 47B determines the states of respective divisions based on the history of information received from respective automated driving vehicles 18. The driving setting unit 47B may also determine the states of the respective divisions based on information supplied by the infra-monitors 41.

At S22, the driving setting unit 47B sets, using map information on the parking facility, a guide path for guiding the automated driving vehicle 18 from the vehicle's current position to the parking position selected at the foregoing S21. At this time, the guide path is set to be the shortest path from the current position to the parking position. However, in cases where the guide path being set for the automated driving vehicle 18 partly overlaps with a guide path set for another vehicle making it possible that, with no preventive measure taken, the two vehicles collide, at least one spot for stopping is set for either of the vehicles.

Namely, the driving setting unit 47B sets a stopping spot for one, with lower-priority, of the two vehicles, while setting the shortest path involving no stopping spot for the other vehicle with higher-priority. Alternatively, the higher-priority vehicle has a path set involving fewer stopping spots or requiring less stopping time than the lower-priority vehicle. Specifically, for a vehicle whose distance level is 1, a shortest path involving no stopping spot is set and, for a vehicle whose distance level is 2, a path involving at least one stopping spot is set. In this configuration, an automated driving vehicle 18 whose remaining fuel amount or remaining battery capacity is small can be given higher priority, so that opportunities requiring such an automated driving vehicle 18 to stop can be reduced and so that the time taken for parking of such an automated driving vehicle 18 can be shortened.

For example, assume that there are plural automated driving vehicles 18, i.e. a first automated driving vehicle 18 and a second automated driving vehicle 18. The driving setting unit 47B may set, based on the travelable distance of each automated driving vehicle 18, first priority for the first automated driving vehicle 18 and second priority lower than the first priority for the second automated driving vehicle 18.

Assume that the driving setting unit 47B sets a first path and a second path for the first automated driving vehicle 18 and the second automated driving vehicle 18, respectively. In this case, the first path is set as a shortest path involving no stopping spot for the first automated driving vehicle 18 until reaching the parking position. Or, in cases where the first path involves a predetermined number of stopping spots or involves a predetermined amount of stopping time, the second path is set to involve more stopping spots than the predetermined number or more stopping time than the predetermined amount of stopping time. Namely, the first path with higher priority compared with the second path with lower priority is set to involve shorter stopping time and to achieve a higher average traveling speed.

Subsequently, in S23, the driving setting unit 47B transmits, using the communication unit 49, information representing the guide path set in the foregoing S22 (hereinafter referred to as "guide path information"). The guide path information serves also as a parking start instruction to the automated driving vehicle 18. As being described later, the automated driving vehicle 18 receives the guide path information and starts automated driving along the guide path.

Subsequently, in S24, the driving setting unit 47B determines whether or not the communication unit 49 has received parking completion notification. The parking completion notification is transmitted by the automated driving vehicle 18 when the vehicle is parked in the parking position at the end of the guide path. When the parking completion notification is determined to have been received, the driving setting unit 47B ends this processing. When no parking completion notification is determined to have been received, processing returns to S24.

1-2-2. Automated Parking Processing Executed by Automated Driving Vehicle 18

Figure 7:
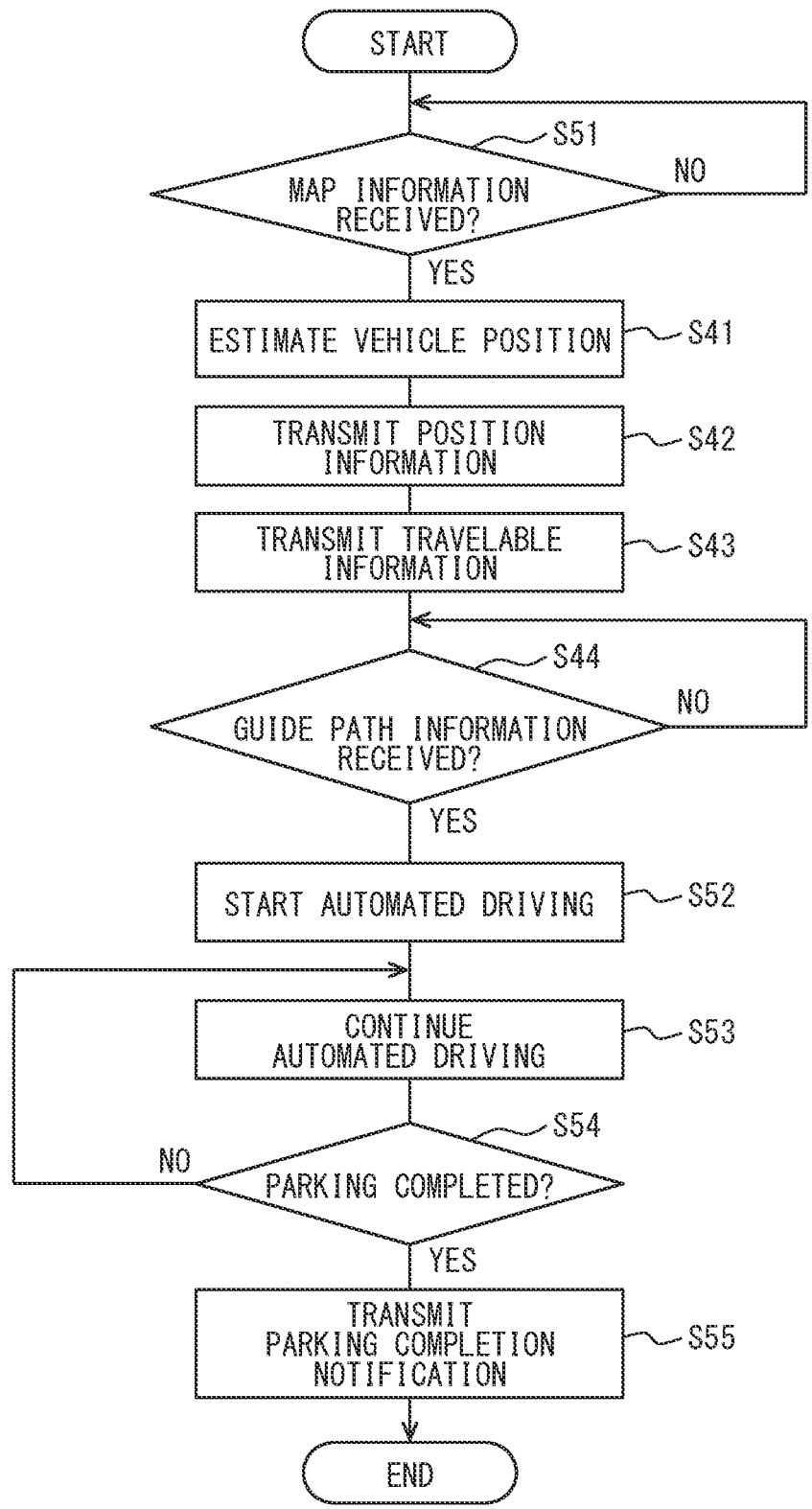
FIG. 7 is a flowchart of an automated parking process.

Automated parking processing executed by the automated driving vehicle 18 will be described with reference to FIG. 7. In the automated parking processing, according to the parking setting processing executed by the management device 39, the automated driving vehicle 18 is automatically driven from the incoming vehicle room 3 to a parking position.

The information transmission unit 69A of the control unit 69 determines, in S51, whether or not the communication unit 75 has received map information on the parking facility. When no map information is determined to have been received, execution of S51 is repeated.

When the map information is determined to have been received, processing advances to S41 where the information transmission unit 69A estimates the current position of the automated driving vehicle 18. In S42, the information transmission unit 69A transmits the result of estimating the current position to the management device 39 as position information on the automated driving vehicle 18.

Subsequently, in S43, the data transmission unit 47A of the control unit 69 transmits travelable information. The travelable information includes, as described above, information related with the travelable distance and information related with vehicle failures. Subsequently, in S44, the driving execution unit 69B of the control unit 69 determines whether or not guide path information has been received. The guide path information is to be transmitted by the management device 39.

When, in S44, the guide path information is determined not to have been received, the driving execution unit 69B repeats execution of S44. When, in S44, the guide path information is determined to have been received, processing advances to S52 where the driving execution unit 69B starts automated driving of the automated driving vehicle 18. In the automated driving, the driving execution unit 69B drives the automated driving vehicle 18 along the path represented by the guide path information.

In S53, the driving execution unit 69B continues automated driving of the automated driving vehicle 18. The driving execution unit 69B repeatedly transmits position information on the automated driving vehicle 18 until, in S54 being described later, parking is determined to have been completed. The position information transmitted is received by the management device 39.

Subsequently, in S54, the driving execution unit 69B determines whether or not parking has been completed. Parking is completed when the automated driving vehicle 18 is parked in the parking position selected by the management device 39. When parking is determined not to have been completed, execution of S54 is repeated.

When parking is determined to have been completed, processing advances to S55 where the driving execution unit 69B transmits parking completion notification using the communication unit 75. The parking completion notification transmitted is received by the management device 39.

1-2-3. Example of Sequence

Figure 8:
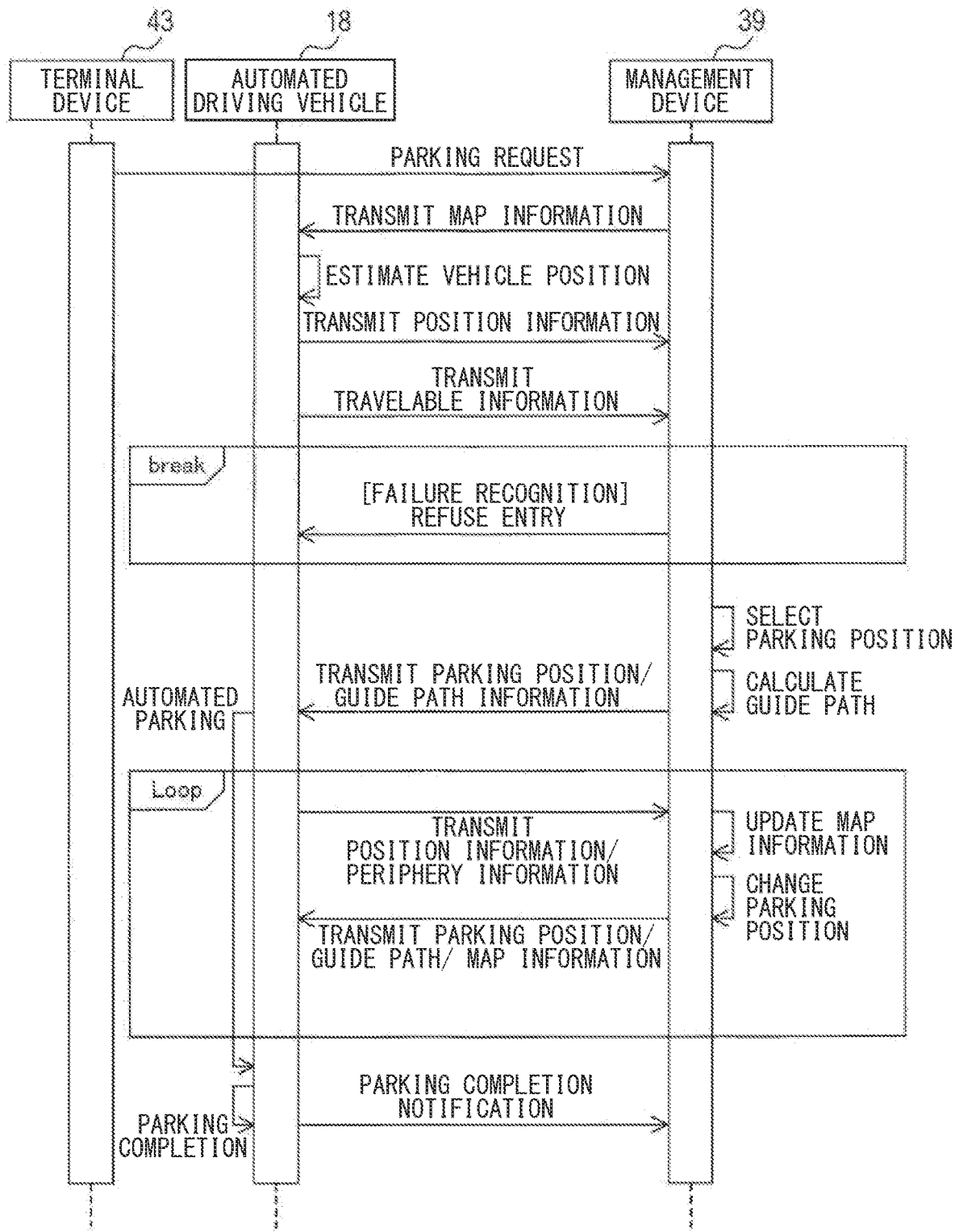
FIG. 8 represents an example of a sequence of execution of a parking setting process and an automated parking process.

An example of a sequence executed by the terminal device 43, the management device 39, and the automated driving vehicle 18 is illustrated in FIG. 8. The sequence illustrated indicates that, when the user performs an input operation using the terminal device 43 to notify of a start of parking, a parking request is transmitted from the terminal device 43 to the management device 39 and that, responding to the parking request, the management device 39 transmits map information to the automated driving vehicle 18. It is also explicitly indicated that, when the automated driving vehicle 18 receives the map information from the management device 39, the automated driving vehicle 18 transmits travelable information on the automated driving vehicle 18 to the management device 39 and that, based on the travelable information transmitted from the automated driving vehicle 18, the management device 39 sets a parking position and a guide path and transmits, as a parking start instruction, information on the parking position and the guide path to the automated driving vehicle 18.

1-3. Advantages

According to the embodiment described in detail above, the following advantages are obtained.

(1a) One aspect of this disclosure is a parking assist system 1 configured to assist parking of a vehicle. The parking assist system 1 includes at least one automated driving vehicle 18, a management device 39, and a terminal device 43.

The at least one automated driving vehicle 18 is configured to be capable of automated driving, in a parking lot, from a getting-off area to a parking position. The management device 39 is configured to transmit information on a guide path leading to the parking position and a parking start instruction to the automated driving vehicle 18. The terminal device 43 is configured for operation by a user of the automated driving vehicle 18 and to be capable of communicating with the management device 39.

The automated driving vehicle 18 further includes an information transmission unit 69A. The information transmission unit 69A is configured to transmit, when predetermined data is received from the management device 39, travelable information representing information related with traveling of the automated driving vehicle 18 to the management device 39.

The management device 39 includes a data transmission unit 47A and a driving setting unit 47B. The data transmission unit 47A is configured to transmit predetermined data to the automated driving vehicle 18. The driving setting unit 47B determines, based on the travelable information transmitted from the automated driving vehicle 18, whether or not parking of the automated driving vehicle 18 is possible. The driving setting unit 47B is configured to instruct, when parking of the automated driving vehicle 18 is possible, the automated driving vehicle 18 to start parking.

According to the parking assist system 1 as described above, whether or not parking of the automated driving vehicle 18 is possible is determined based on the travelable information. Therefore, it is possible to refuse parking by the automated driving vehicle 18 when parking is determined not to be possible, for example, with the vehicle that would run out of fuel or battery capacity. This can prevent the automated driving vehicle 18 from stalling in the parking lot.

(1b) In one aspect of this disclosure, the data transmission unit 47A transmits, when a parking request requesting parking of the automated driving vehicle 18 in a parking position is received from the terminal device 43, predetermined data.

According to the parking assist system 1 as described above, the automated driving vehicle 18 can transmit the travelable information to the management device 39 after a parking request was made but before receiving a parking start instruction. Therefore, wasteful communication such as transmission of the travelable information before transmitting a parking request can be suppressed.

(1c) In one aspect of this disclosure, the information transmission unit 69A is configured to transmit, as the travelable information, information on the remaining fuel amount or remaining battery capacity of the automated driving vehicle 18. The driving setting unit 47B sets, when parking of the automated driving vehicle 18 is possible, a parking position according to the remaining fuel amount or remaining battery capacity.

According to the parking assist system 1 as described above, the management device 39 sets a parking position according to the remaining fuel amount or remaining battery capacity of the automated driving vehicle 18. Therefore, the parking position can be set such that the fuel or battery capacity of the automated driving vehicle 18 is unlikely to run out between entry and leaving of the automated driving vehicle 18.

(1d) In one aspect of this disclosure, the driving setting unit 47B sets, as the remaining fuel amount or remaining battery capacity reduces, a parking position in the area that is, among plural parking areas preset in the parking lot, nearest to a riding area or a getting-off area in the parking lot.

According to the parking assist system 1 as described above, a parking position is set in the parking area nearest to the riding area or the getting-off area, so that the distance to be traveled by the automated driving vehicle 18 can be made a shortest possible distance. This can make the fuel or battery capacity of the automated driving vehicle 18 unlikely to run out.

(1e) In one aspect of this disclosure, the driving setting unit 47B sets, as the remaining fuel amount or the remaining battery capacity reduces, a guide path leading with higher priority to a parking position.

According to the parking assist system 1 as described above, after a parking position is set, a guide path can be set in such a way as to reduce the time required for parking. Therefore, in cases where the guide path for the automated driving vehicle 18 overlaps with the guide path for another automated driving vehicle 18 making it necessary for the guide path for either automated driving vehicle 18, i.e. the lower-priority vehicle, to involve a stopping spot in order to avoid a collision with the higher-priority vehicle, it is possible to suppress the occurrence of an automated driving vehicle 18 with a low-level of remaining fuel amount or remaining battery capacity being obliged to stop.

(1f) In one aspect of this disclosure, the driving setting unit 47B sets, as the remaining fuel amount or the remaining battery capacity reduces, a parking position in, out of plural preset parking areas in the parking lot, the parking area farthest from the riding area or the getting-off area in the parking lot.

According to the parking assist system 1 as described above, a parking position is set in the parking area farthest from the riding area or the getting-off area. Therefore, when the parking lot is of a type in which parking position exchanges between vehicles become necessary, the occurrence of necessity of changing parking positions can be suppressed. This can make it unlikely that the automated driving vehicle 18 runs out of fuel or battery capacity in the parking lot.

(1g) In one aspect of this disclosure, the information transmission unit 69A is configured to transmit, as the travelable information, information on the remaining fuel amount or remaining battery capacity of the automated driving vehicle 18 or information on a failure of the automated driving vehicle 18. Also, the driving setting unit is configured to determine, when the remaining fuel amount or the remaining battery capacity is smaller than a predetermined threshold or when the information on the failure includes information on a prescribed type of a failure, that parking of the automated driving vehicle is not possible.

According to the parking assist system 1 as described above, parking of the automated driving vehicle can be refused based on the information on the remaining fuel amount or remaining battery capacity or the failure information. It is, therefore, possible to avoid as much as possible situations in which the automated driving vehicle has difficulty in automated parking, that is, situations in which the automated driving vehicle is stalled in the parking lot.

(1h-1) In one aspect of this disclosure, the driving setting unit 47B is configured to determine, when the remaining fuel amount or the remaining battery capacity is smaller than a first predetermined threshold, that parking of the automated driving vehicle 18 is not possible.

(1h-2) In one aspect of this disclosure, the driving setting unit 47B is configured to determine, when the remaining fuel amount or the remaining battery capacity is equal to or larger than a second predetermined threshold larger than the first threshold, that parking of the automated driving vehicle 18 is possible.

(1h-3) In one aspect of this disclosure, the driving setting unit 47B is configured to set, when the remaining fuel amount or the remaining battery capacity is equal to or larger than the first threshold and smaller than the second threshold, a parking position in, out of plural preset parking areas in the parking lot, the parking area nearest to the riding area or the getting-off area.

(1h-4) According to the above configurations (1h-1) to (1h-3), whether or not to allow parking can be set according to the remaining fuel amount or the remaining battery capacity. Also, when the remaining fuel amount or the remaining battery capacity is at a low level, by setting a parking position in a nearest parking area, the distance to be traveled by the automated driving vehicle 18 in the parking facility can be minimized, so that the fuel or battery capacity can be prevented from running out.

(1i-1) In one aspect of this disclosure, the automated driving vehicles 18 include a first automated driving vehicle and a second automated driving vehicle, and the driving setting unit 47B is configured to set, based on the travelable information, a first priority for the first automated driving vehicle 18 and a second priority for the second automated driving vehicle 18, the second priority being lower than the first priority, and to set, according to the priorities set for the first and second automated driving vehicles 18, a first path for the first automated driving vehicle 18 and a second path for the second automated driving vehicle 18.

(1i-2) In one aspect of this disclosure, the driving setting unit 47B is configured to set, as the first path, a path involving no stopping spot for the first automated driving vehicle 18 until reaching a parking position and, as the second path, a path involving at least one stopping spot for the second automated driving vehicle 18 before reaching a parking position.

(1i-3) In one aspect of this disclosure, the driving setting unit 47B is configured to set, as the first path, a path to involve a predetermined amount of stopping time and, as the second path, a path to involve stopping time longer than the predetermined amount of stopping time.

(1i-4) According to the above configurations (1i-1) to (1i-3), a guide path can be set according to the priority set for each automated driving vehicle 18. In doing so, by setting the higher-priority first path as a path involving no stopping spot, the first automated driving vehicle can be made to reach a target position earlier. Also, in cases where the first path involves a stopping spot, by setting the stopping time involved in the second path to be longer than the stopping time involved in the first path, the automated driving vehicle 18 to travel along the first path can be made to travel with relatively higher priority.

2. Other Embodiments

An embodiment of this disclosure has been described above, but this disclosure can be implemented in various modified forms without being limited to the above embodiment.

(2a-1) For example, the travelable information may be transmitted before a parking request signal is transmitted to the management device 39. In the following, an example of a configuration in which the travelable information is transmitted from the automated driving vehicle 18 before the management device 39 receives a parking request and whether or not parking of the automated driving vehicle 18 is possible is then determined will be described with reference to FIG. 9. Other configurations not particularly described are the same as in the foregoing embodiment.

Figure 9:
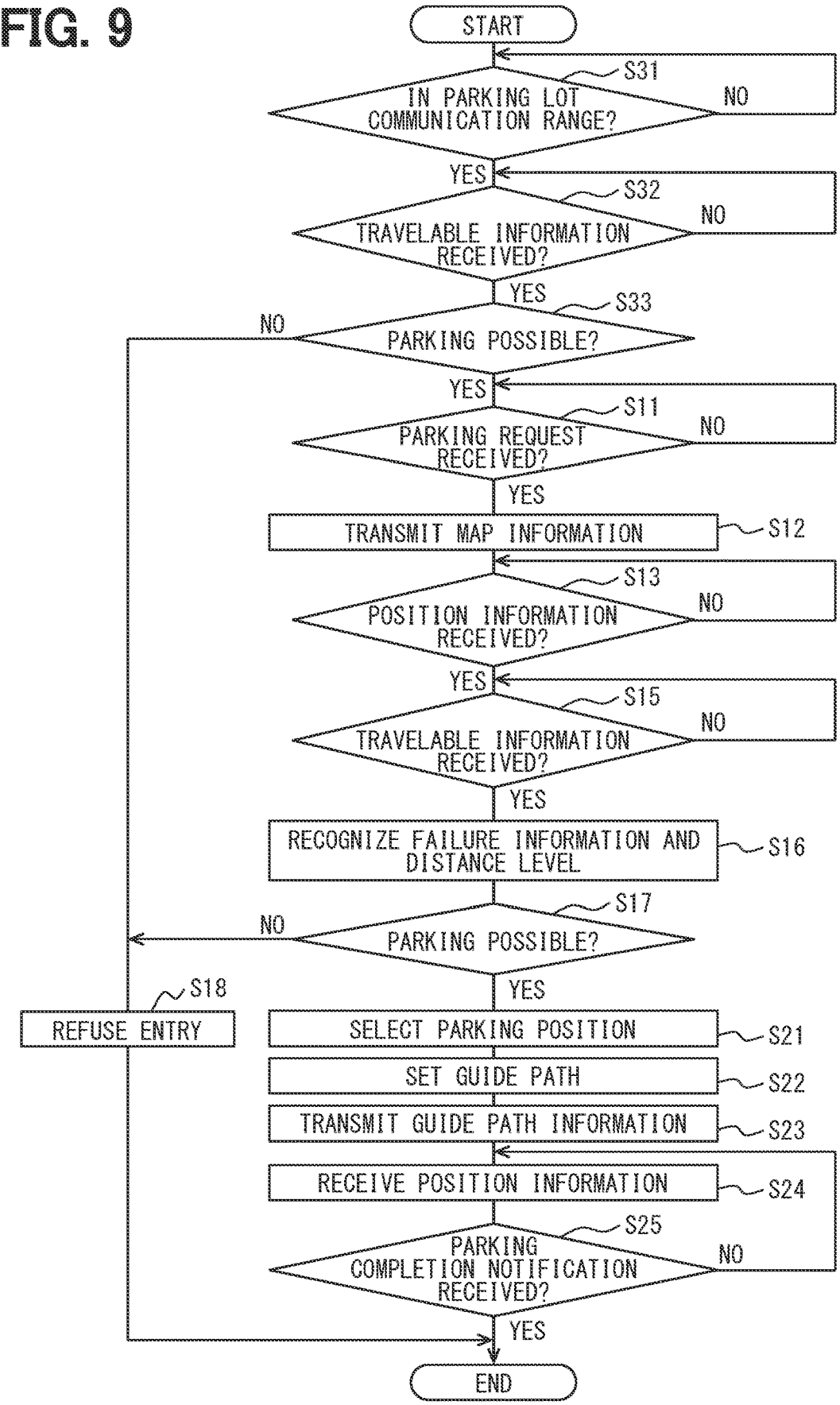
FIG. 9 is a flowchart of the parking setting process.

FIG. 9 is a flowchart of parking setting processing. The processing represented by the flowchart shown in FIG. 9 starts when the automated driving vehicle 18 enters an operating state. The operating state is, for example, a state with the engine of the automated driving vehicle started. The processing may also be started, by omitting S31, from S32 using entering of the automated driving vehicle 18 into a communication range of the parking lot as a trigger.

The automated driving vehicle 18 enters the communication range of the parking lot before entering the incoming vehicle room 3. Specifically, when the automated driving vehicle 18 comes in front of or near the entrance 15, it becomes possible for the automated driving vehicle 18 to communicate with the communication equipment of the parking lot. Or, at the latest, the automated driving vehicle 18 enters a state where communication with the communication equipment of the parking lot is possible before outputting a parking request signal to the management device 39.

In S31, whether or not the automated driving vehicle 18 has entered the communication range of the parking lot is determined. Namely, whether or not the communication unit 75 of the automated driving vehicle 18 is in a state where communication with the communication unit 49 is possible is determined. When the determination made in S3 is negative, execution of S31 is repeated. When, in S31, the automated driving vehicle 18 is determined to have entered the communication range of the parking lot, processing advances to S32.

In S32, whether or not the driving setting unit 47B of the management device 39 has received the travelable information from the automated driving vehicle 18 is determined.

When, in S32, the travelable information is determined not to have been received from the automated driving vehicle 18, the driving setting unit 47B repeats execution of S32. When the travelable information is determined to have been received from the automated driving vehicle 18, processing advances to S33 where whether or not parking of the automated driving vehicle 18 is possible is determined based on the travelable information transmitted from the automated driving vehicle 18.

When parking is determined possible, processing advances to S11 where the driving setting unit 47B determines whether or not a parking request signal has been received. In other words, this processing remains in a stand-by state until the management device 39 receives a parking request signal.

When parking is determined not possible, processing advances to S18 where the driving setting unit 47B refuses entry of the automated driving vehicle 18 and ends parking setting processing. Note that, in S17 of this processing, the driving setting unit 47B determines whether or not parking of the automated driving vehicle 18 is possible according to contents not taken into account in S32 of the travelable information.

(2a-2) In the parking assist system 1 described above (2a-1) as a modification example, the management device includes the driving setting unit 47B that is configured to receive the travelable information transmitted from the automated driving vehicle 18 representing information related with traveling of the automated driving vehicle 18 and also includes the data transmission unit 47A that is configured to transmit, when a parking request requesting parking of the automated driving vehicle 18 in a parking position is received from the terminal device 43 configured to be capable of communicating with the management device 39, predetermined data to the automated driving vehicle 18. The driving setting unit 47B is configured to receive, before a parking request is received from the terminal device 43, the travelable information from the automated driving vehicle 18 and determine, based on the travelable information received, whether or not parking of the automated driving vehicle 18 is possible.

According to the configuration as described above, the management device 39 can determine, before receiving a parking request, whether or not parking of the automated driving vehicle 18 is possible. Therefore, the time during which the user is kept waiting at the terminal device 43 when transmitting, after making a parking request, a parking request signal using the terminal device 43 can be shortened.

In the above modified parking assist system 1, a display device is installed inside the incoming vehicle room 3 or near the entrance of the incoming vehicle room 3 for notifying that automated parking is not possible. Therefore, the user can recognize, before getting out of the automated driving vehicle 18, that automated parking of the automated driving vehicle 18 is not possible. This improves the convenience of the parking assist system 1.

(2b) Though, in the above embodiment, parking area selection is changed according to whether the distance level is 1 or 2, a different configuration may be used. For example, the intermediate area 7B may be further divided into plural parking areas, and additional distance levels 3 and 4 may be set. Namely, the distance levels may be further divided, and the parking areas and guide paths may be further classified according to the travelable information.

Using the configuration modified as described above makes it possible to park the automated driving vehicle 18 more appropriately.

(2c) Plural functions of a single component in the above embodiment may be realized by plural components, and a single function of a single component may be realized by plural components. Also, plural functions of plural components may be realized by a single component, and a single function realized by plural components may be realized by a single component. Furthermore, a part of the configuration of the above embodiment may be omitted. Still furthermore, at least a part of the configuration of the above embodiment may be added to or may replace another configuration of the above embodiment.

(2d) Besides the parking assist system 1 described above, this disclosure can also be realized using, in various forms, for example, components of the parking assist system 1 such as the management device 39 and the automated driving vehicle 18, or a program used by components of the parking assist system 1 to make a computer function, a non-transitory substantial recording medium like a semiconductor memory holding the program, and parking assisting methods.

The invention claimed is:

1. A parking assist system configured to assist parking of vehicles, the system comprising:
at least one automated driving vehicle configured to perform automated driving, in a parking lot, from a getting-off area to a parking position; and
a management device configured to transmit, to the automated driving vehicle, a guide path to the parking position and a parking start instruction, wherein
the at least one automated driving vehicle includes an information transmission unit that is configured to transmit, to the management device, travelable information relating to travelling of the at least one automated driving vehicle in response to receiving predetermined data from the management device,
the management device includes:
a data transmission unit configured to transmit the predetermined data to the at least one automated driving vehicle; and
a driving setting unit configured to:
determine, based on the travelable information transmitted from the at least one automated driving vehicle, whether parking of the at least one automated driving vehicle is possible; and
instruct the at least one automated driving vehicle to start parking in response to determining that parking of the at least one automated driving vehicle is possible.

2. The parking assist system according to claim 1, wherein the data transmission unit is configured to transmit the predetermined data in response to receiving a parking request for parking of the at least one automated driving vehicle to the parking position from a terminal device of a user of the at least one automated driving vehicle, the terminal device being configured to communicate with the management device.

3. The parking assist system according to claim 1, wherein the information transmission unit is configured to transmit, as the travelable information, a remaining fuel amount or a remaining battery capacity of the at least one automated driving vehicle, and
the driving setting unit is configured to set the parking position according to the remaining fuel amount or the remaining battery capacity when parking of the at least one automated driving vehicle is determined to be possible.

4. The parking assist system according to claim 3, wherein the parking lot includes a riding area, the getting-off area, and a plurality of parking areas, and
the driving setting unit is configured to set the parking position in one of the plurality of parking areas that is closest to the riding area or the getting-off area when the remaining fuel amount or the remaining battery capacity is decreased.

5. The parking assist system according to claim 3, wherein the at least one automated driving vehicle is a plurality of automated driving vehicles, and
the driving setting unit is configured to set a guide path with higher priority for one of the plurality of automated driving vehicles than a guide path set for others of the plurality of automated driving vehicles when the remaining fuel amount or the remaining battery capacity of the one of the plurality of automated driving vehicles is decreased.

6. The parking assist system according to claim 3, wherein the parking lot includes a riding area, the getting-off area, and a plurality of parking areas, and
the driving setting unit is configured to set the parking position in one of the plurality of parking areas that is farthest from the riding area or the getting-off area when the remaining fuel amount or the remaining battery capacity is decreased.

7. The parking assist system according to claim 3, wherein the information transmission unit is configured to transmit, as the travelable information, information of the remaining fuel amount or the remaining battery capacity of the at least one automated driving vehicle or failure information of the at least one automated driving vehicle, and
the driving setting unit is configured to determine that parking of the at least one automated driving vehicle is not possible when the remaining fuel amount or the remaining battery capacity is smaller than a predetermined threshold or when the failure information indicates a predetermined type of a failure in the at least one automated driving vehicle.

8. The parking assist system according to claim 3, wherein the driving setting unit is configured to determine that parking of the automated driving vehicle is not possible when the remaining fuel amount or the remaining battery capacity is smaller than a first predetermined threshold.

9. The parking assist system according to claim 8, wherein the driving setting unit is configured to determine that parking of the at least one automated driving vehicle is possible when the remaining fuel amount or the remaining battery capacity is equal to or larger than a second predetermined threshold that is larger than the first threshold.

10. The parking assist system according to claim 9, wherein
the parking lot includes a riding area, the getting-off area, and a plurality of parking areas, and
the driving setting unit is configured to set the parking position in one of the plurality of parking areas that is closest to the riding area or the getting-off area when the remaining fuel amount or the remaining battery capacity is equal to or larger than the first predetermined threshold and smaller than the second predetermined threshold.

11. The parking assist system according to claim 1, wherein
the information transmission unit is configured to transmit, as the travelable information, information of a travelable distance of the at least one automated driving vehicle, and
the driving setting unit is configured to:
determine a travelable distance level of the at least one automated driving vehicle based on the information of the travelable distance received from the information transmission unit; and
set the parking position according to the travelable distance level when parking of the automated driving vehicle is determined to be possible.

12. The parking assist system according to claim 1, wherein
the at least one automated driving vehicle further includes a sensor that is configured to detect a remaining fuel amount in a fuel tank of the at least one automated driving vehicle,
the information transmission unit is configured to transmit, as the travelable information, the remaining fuel amount detected by the sensor, and
the driving setting unit is configured to set the parking position according to the remaining fuel amount when parking of the automated driving vehicle is determined to be possible.

13. The parking assist system according to claim 1, wherein
the at least one automated driving vehicle is an automated driving vehicle driven by a battery and includes a control unit that is configured to estimate a remaining battery capacity of the battery based on an input/output current, voltage, and a temperature of the battery,
the information transmission unit is configured to transmit, as the travelable information, information of the remaining battery capacity estimated by the control unit, and
the driving setting unit is configured to set the parking position according to the remaining battery capacity when parking of the automated driving vehicle is determined to be possible.

14. The parking assist system according to claim 1, wherein
the at least one automated driving vehicle includes a first automated driving vehicle and a second automated driving vehicle, and
the driving setting unit is configured to set:
a first priority for the first automated driving vehicle and a second priority lower than the first priority for the second automated driving vehicle based on the travelable information; and
a first path for the first automated driving vehicle and a second path for the second automated driving vehicle.

15. The parking assist system according to claim 14, wherein
the driving setting unit is configured to set:
as the first path, a path to the parking position without a stopping spot for the first automated driving vehicle; and
as the second path, a path to the parking position with at least one stopping spot for the second automated driving vehicle.

16. The parking assist system according to claim 14, wherein
the driving setting unit is configured to set:
as the first path, a path along which the first automated driving vehicle involves a predetermined amount of stopping time; and
as the second path, a path along which the second automated driving vehicle involves stopping time longer than the predetermined amount of stopping time.

17. A parking assist system configured to assist parking of an automated driving vehicle that is configured to perform automated driving, in a parking lot, from a getting-off area to a parking position, the parking assist system comprising:
a management device configured to transmit, to the automated driving vehicle, a guide path to the parking position and a parking start instruction, wherein
the management device includes:
a driving setting unit configured to receive travelable information transmitted from the automated driving vehicle, the travelable information being information relating to traveling of the automated driving vehicle; and
a data transmission unit configured to transmit predetermined data to the automated driving vehicle in response to receiving a parking request for parking of the automated driving vehicle to the parking position from a terminal device that is configured to communicate with the management device, and
the driving setting unit is configured to, prior to receiving the parking request from the terminal device:
receive the travelable information from the automated driving vehicle; and
determine whether parking of the automated driving vehicle is possible based on the received travelable information.

18. A parking assist system configured to assist parking of vehicles, the system comprising:
at least one automated driving vehicle configured to perform automated driving, in a parking lot, from a getting-off area to a parking position; and
a management device configured to transmit, to the automated driving vehicle, a guide path to the parking position and a parking start instruction, wherein
the at least one automated driving vehicle includes an information transmission unit that is configured to transmit, to the management device, travelable information relating to travelling of the at least one automated driving vehicle in response to receiving predetermined data from the management device,
the management device includes at least one processor configured to:
transmit the predetermined data to the at least one automated driving vehicle;
determine, based on the travelable information transmitted from the at least one automated driving vehicle, whether parking of the at least one automated driving vehicle is possible; and
instruct the at least one automated driving vehicle to start parking in response to determining that parking of the at least one automated driving vehicle is possible.

* * * * *